US012529768B2

(12) United States Patent
Li

(10) Patent No.: US 12,529,768 B2
(45) Date of Patent: Jan. 20, 2026

(54) GALVANOMETER AND LiDAR

(71) Applicant: SUTENG INNOVATION TECHNOLOGY CO., LTD., Shenzhen (CN)

(72) Inventor: Yipeng Li, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 516 days.

(21) Appl. No.: 18/084,475

(22) Filed: Dec. 19, 2022

(65) Prior Publication Data

US 2023/0213622 A1 Jul. 6, 2023

(30) Foreign Application Priority Data

Dec. 31, 2021 (CN) .......................... 202111674124.4

(51) Int. Cl.
*G02B 26/08* (2006.01)
*G01S 7/481* (2006.01)
*G02B 26/10* (2006.01)

(52) U.S. Cl.
CPC ........ *G01S 7/4817* (2013.01); *G02B 26/0833* (2013.01); *G02B 26/101* (2013.01); *G02B 26/105* (2013.01)

(58) Field of Classification Search
CPC . G01S 7/4817; G02B 26/0833; G02B 26/101; G02B 26/105; Y02A 90/10
See application file for complete search history.

(56) References Cited

U.S. PATENT DOCUMENTS

2021/0157127 A1\* 5/2021 Sakurai .............. G02B 26/0833
2021/0364606 A1 11/2021 Matsuda et al.

FOREIGN PATENT DOCUMENTS

CN 113534105 A 10/2021

OTHER PUBLICATIONS

First Office Action issued in related Chinese Application No. 202111674124.4, mailed May 31, 2024, 8 pages.

\* cited by examiner

*Primary Examiner* — Euncha P Cherry
(74) *Attorney, Agent, or Firm* — BAYES PLLC

(57) ABSTRACT

This application discloses a galvanometer and a LiDAR. The galvanometer includes a first shaft and a second shaft. A first shaft drive voltage is used to control the galvanometer to vibrate around the first shaft, a second shaft drive voltage is used to control the galvanometer to vibrate around the second shaft, and the first shaft drive voltage and the second shaft drive voltage are superimposed to drive the galvanometer. There are N working intervals in a second shaft drive period, and in the N working intervals, the second shaft drive voltage and the first shaft drive voltage jointly drive the galvanometer to form N scanning tracks. The N scanning tracks do not coincide and N is a positive integer.

6 Claims, 13 Drawing Sheets

GALVANOMETER AND LiDAR

CROSS-REFERENCE TO RELATED APPLICATION

The present application claims the benefit of priority to China Patent Application No. CN 202111674124.4, filed on Dec. 31, 2021, the content of which is incorporated herein by reference in its entirety.

TECHNICAL FIELD

This application relates to the field of galvanometer control technologies, and in particular, to a galvanometer and a LiDAR.

BACKGROUND

In a laser scanning process, a laser beam is incident on a galvanometer, and an angle of a mirror in the galvanometer is controlled, so that the mirror scans along axes X and Y respectively, to deflect the laser beam. There are mainly two types of existing galvanometers for scanning: I) two single-shaft galvanometers are connected in series for laser scanning; and II) a design solution of a galvanometer driven by a coil shared by fast and slow axes is used, and torsion of a galvanometer in Micro-Electro-Mechanical System (MEMS) is controlled, to perform laser scanning. When a conventional sine wave and a triangular wave are combined to drive the galvanometer to obtain a single-frame image, there is a large unscanned gap, thereby causing problems of a large blind area and low resolution.

SUMMARY

Embodiments of this application provide a galvanometer and a LiDAR, to supplement a blank region of single-frame scanning, reduce blind area, and improve scanning resolution by optimizing a galvanometer control method. Technical solutions are as follows.

According to a first aspect, an embodiment of this application provides a galvanometer, where the galvanometer includes a first shaft and a second shaft, a first shaft drive voltage is used to control the galvanometer to vibrate around the first shaft, and a second shaft drive voltage is used to control the galvanometer to vibrate around the second shaft; and the first shaft drive voltage and the second shaft drive voltage are superimposed to drive the galvanometer; and there are N working intervals in a second shaft drive period, in the N working intervals, the second shaft drive voltage and the first shaft drive voltage jointly drive the galvanometer to form N scanning tracks, and the N scanning tracks do not coincide, where N is a positive integer.

In an embodiment, N=2; and the second shaft drive period includes a first working interval and a second working interval; and a voltage changing rate of the first working interval and a voltage changing rate of the second working interval are opposite numbers, a maximum voltage value of the first working interval is the same as a maximum voltage value of the second working interval, and a minimum voltage value of the first working interval is the same as a minimum voltage value of the second working interval.

In an embodiment, the second shaft drive period is corresponding to (M+½) first shaft drive periods, M is a positive integer, and a start moment of the first working interval is the same as a start moment of an initial first shaft drive period.

In an embodiment, when M is an odd number, an end moment of the first working interval is the same as a moment corresponding to a $([M/2]+3/4)^{th}$ first shaft drive period, and a start moment of the second working interval is the same as the end moment of the first working interval; or when M is an even number, an end moment of the first working interval is the same as the moment corresponding to a $([M/2]+1/4)^{th}$ second shaft drive period, and the start moment of the second working interval is the same as the end moment of the first working interval.

In an embodiment, N is greater than or equal to 2; and voltage changing rates respectively corresponding to N working intervals are the same, maximum voltage values respectively corresponding to the N working intervals are the same, and minimum voltage values respectively corresponding to the N working intervals are the same.

In an embodiment, each working interval is corresponding to X consecutive first shaft drive periods; and X is a positive integer; and a difference between an initial phase of an initial first shaft drive period corresponding to an $i^{th}$ working interval and an initial phase of an initial first shaft drive period corresponding to the first working interval is $$\frac{i-1}{N} \times 360°,$$

where i is a positive integer less than or equal to N.

In an embodiment, there are further a flyback interval and a delay interval between two adjacent working intervals, a start moment of the flyback interval is the same as an end moment of a previous working interval, an end moment of the flyback interval is the same as a start moment of the delay interval, an end moment of the delay interval is the same as a start moment of a next working interval, a maximum voltage value of the flyback interval is the same as a maximum voltage value of any working interval, and a minimum voltage value of the flyback interval is the same as a minimum voltage value of any working interval.

In an embodiment, flyback intervals have equal duration and delay intervals have equal duration.

In an embodiment, a sum of the duration of the flyback interval and the delay interval is the same as the duration corresponding to $$\frac{1}{N}$$

first shaft drive periods.

According to a second aspect, an embodiment of this application provides a LiDAR, including: a laser emitter, a controller, and the galvanometer according to any one of the embodiments of the first aspect, where the laser emitter is configured to emit a laser beam;

the controller is connected to both the laser emitter and the galvanometer, and is configured to, control the laser emitter to emit a laser beam, and control a first shaft drive voltage and a second shaft drive voltage of the galvanometer; and the galvanometer is configured to receive and deflect the laser beam emitted by the laser emitter, to change an outgoing angle of the laser beam to implement scanning.

The beneficial effects provided by the technical solutions include at least:

In some embodiments of this application, the galvanometer includes a first shaft and a second shaft, a first shaft drive voltage is used to control the galvanometer to vibrate around the first shaft, and the second shaft drive voltage is used to control the galvanometer to vibrate around the second shaft; and the first shaft drive voltage and the second shaft drive voltage are superimposed to drive the galvanometer; and there are N working intervals in a second shaft drive period, in the N working intervals, the second shaft drive voltage and the first shaft drive voltage jointly drive the galvanometer to form N scanning tracks, and the N scanning tracks do not coincide, where N is a positive integer. Scanning is performed by using the galvanometer, which can supplement a blank region of single-frame scanning, reduce blind area, and improve scanning resolution. The greater number of working intervals included in the second shaft drive period, that is, a greater value of N, indicates higher scanning resolution in the vertical direction and a smaller blind area.

The foregoing description is merely an overview of the technical solution in this application. The following describes embodiments of the present application in detail.

BRIEF DESCRIPTION OF DRAWINGS

To describe the technical solutions in the embodiments of this application more clearly, the following briefly describes the accompanying drawings. Apparently, the accompanying drawings in the following descriptions show merely some embodiments of this application, and a person of ordinary skill in the art may derive other drawings from these accompanying drawings without creative efforts.

Reference signs: 210—base; 220—coil frame; 230—mirror; 240—first shaft; 250—second shaft; and 260—external magnetic field.

DETAILED DESCRIPTION

To make features and advantages of this application clearer, the following describes the technical solutions in the embodiments of this application with reference to the accompanying drawings. Apparently, the described embodiments are some but not all the embodiments of this application. Other embodiments obtained by a person skilled in the art based on the embodiments of this application without creative efforts shall fall within the protection scope of this application.

Terms "first," "second," "third," and the like in this specification and claims of this application and the foregoing drawings are used to distinguish different objects, instead of describing a specific sequence. In addition, terms such as "include," "have," and any variant thereof are intended to cover non-exclusive inclusion. For example, a process, a method, a system, a product, or a device that includes a series of steps or units is not limited to the listed steps or units, but further includes an unlisted step or unit, or further includes another inherent step or unit of the process, the method, the product, or the device.

Figure 1:
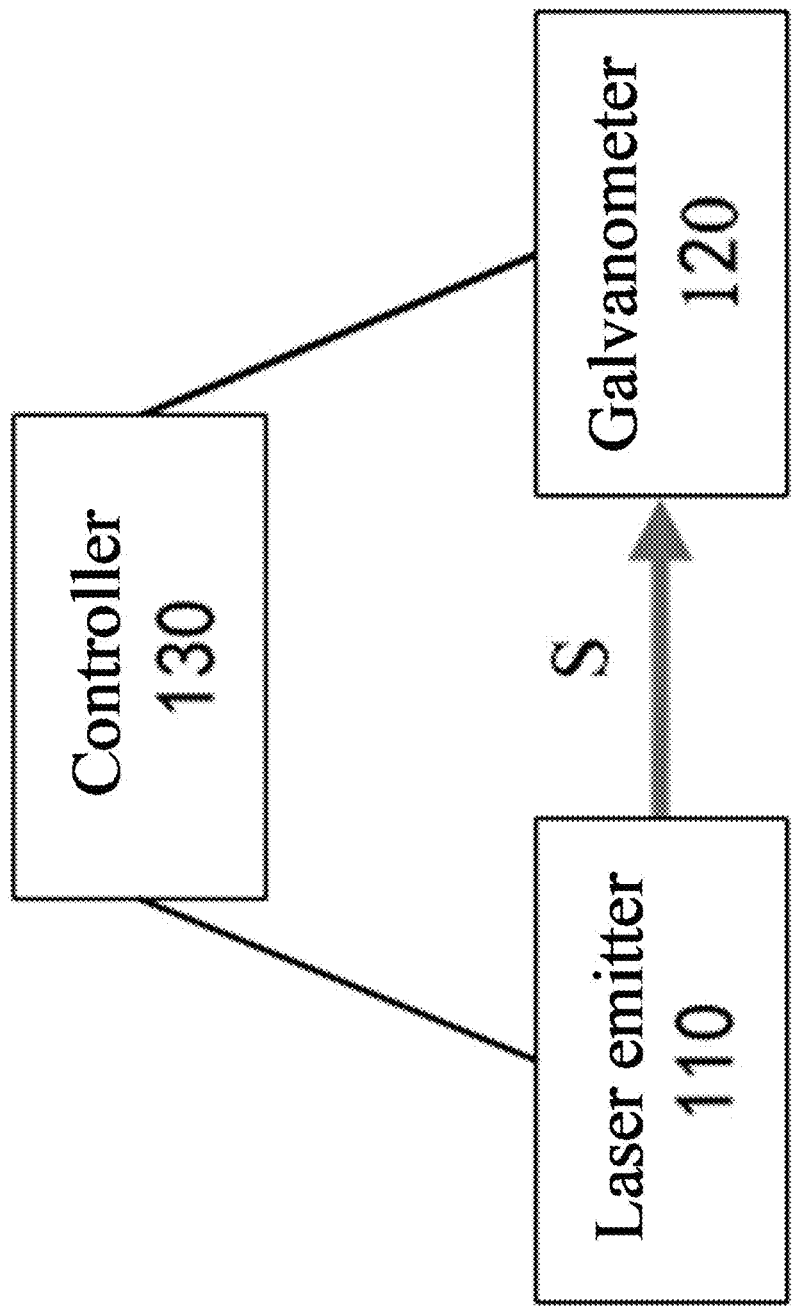
FIG. 1 is a schematic structural diagram of a LiDAR according to an exemplary embodiment of this application.

FIG. 1 exemplarily shows a schematic structural diagram of a LiDAR according to an embodiment of this application. As shown in FIG. 1, the LiDAR may include: a laser emitter 110, a galvanometer 120, and a controller 130.

The laser emitter 110 is configured to emit a laser beam S.

The galvanometer 120 is configured to receive and deflect the laser beam S emitted by the laser emitter 110, to change an outgoing angle of the laser beam S to implement scanning.

The controller 130 is connected to both the laser emitter 110 and the galvanometer 120, and is configured to: control the laser emitter 110 to emit a laser beam S. and control a first shaft drive voltage, a second shaft drive voltage, and the like of the galvanometer 120.

Figure 2:
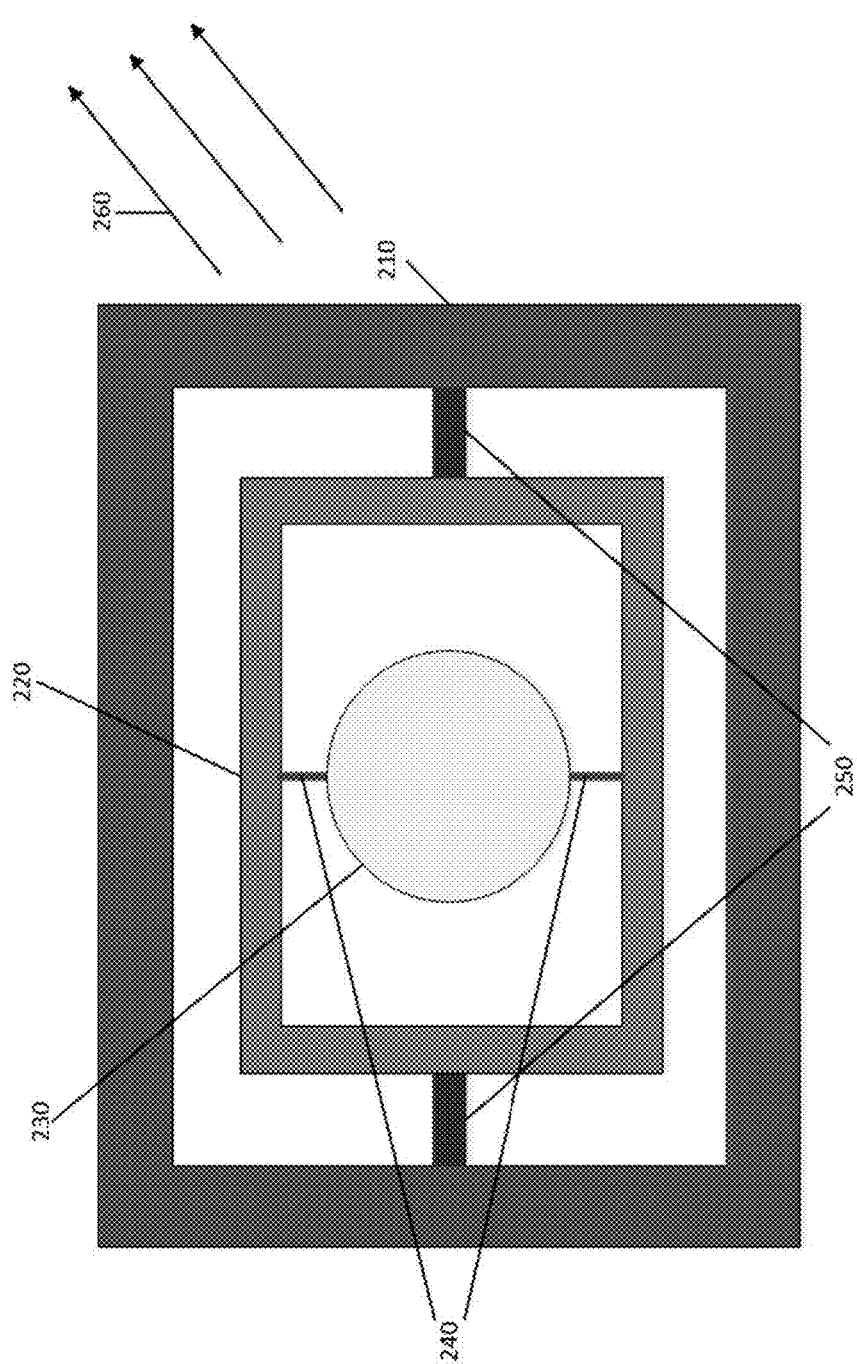
FIG. 2 is a schematic structural diagram of a MEMS galvanometer according to an exemplary embodiment of this application.

The foregoing galvanometer 120 may be a MEMS galvanometer. With reference to FIG. 2, the following describes a structure of the LiDAR that is shown in FIG. 1 and that uses the MEMS galvanometer as the galvanometer 120. FIG. 2 exemplarily shows a schematic structural diagram of a MEMS galvanometer according to an embodiment of this application. As shown in FIG. 2, the MEMS galvanometer may include: a base 210, a coil frame 220, a mirror 230, a first shaft 240, a second shaft 250, and an external magnetic field 260.

The base 210 is configured to fix and install the entire galvanometer structure, and has a hollow part in the middle to accommodate a movable component.

The mirror 230 is configured to reflect a laser beam S. The mirror 230 can also be rotated along the first shaft and the second shaft to enable the laser beam S to scan various positions in a field of view (frame). The first shaft and the second shaft are shafts in the same plane, and the first shaft and the second shaft may be perpendicular to each other, or may form an included angle that is not equal to 0° and 180°. Exemplarily, when the first shaft and the second shaft are perpendicular to each other and the second shaft of the MEMS galvanometer is placed in a horizontal direction, the MEMS galvanometer rotates along the first shaft to scan in a first direction, and the first direction may be a pitch direction; or the MEMS galvanometer rotates along the second shaft to scan in a second direction, and the second direction may be the horizontal direction. The first direction may be the horizontal direction, the second direction may be the pitch direction, and so on. This is not specifically limited in this application.

The first shaft 240 is configured to allow the mirror 230 to rotate around the first shaft in the first direction.

The second shaft 250 is configured to allow the coil frame 220 to rotate around the second shaft in the second direction, to drive the mirror 230 to rotate in the second direction.

The coil frame 220 may be a structure with a plurality of turns of wound wires for generating electromagnetic force to control the mirror 230 to rotate in the second direction. The structure with a plurality of turns of wound wires may be provided at the back of the mirror 230 to generate electromagnetic force to control the mirror 230 to rotate in the first direction. Left and right sides of the coil frame 220 may be connected to the base 210 by providing the second shaft 250, and upper and lower sides of the coil frame 220 may be connected to the mirror 230 by providing the first shaft 240.

The external magnetic field 26i0 can be arranged obliquely, so that the coil frame 220 generates electromagnetic force to rotate the mirror 230 in both the first direction and the second direction.

The structure of the galvanometer for scanning is not limited to the galvanometer shown in FIG. 2, that is, the MEMS galvanometer, and the number and the structure of galvanometers are only exemplary. In an implementation, the galvanometer may include two single-shaft galvanometers connected in series, or use two different coil frames 220 to control the mirror 230 to rotate respectively in the first direction and the second direction, or have other types of structures, which is not specifically limited in the embodiments of this application.

With reference to FIG. 3A to FIG. 5, the following introduces a scanning principle of the MEMS galvanometer 120 shown in FIG. 2.

When the MEMS galvanometer is driven at a second shaft drive voltage, under the action of the electromagnetic force, the entire coil frame 220 is inclined to some extent. The greater the drive voltage, the larger the rotation angle. When driven at the second shaft drive voltage in a form of a slow sawtooth-shaped wave, the mirror 230 periodically reciprocates in the second direction as the coil frame 220 rotates. Based on this, the second shaft drive voltage and the first shaft drive voltage are superimposed for driving, to form a comprehensive modulation wave, thereby controlling a scanning track of the entire MEMS galvanometer in the entire image.

The second shaft drive voltage is used to control the mirror to rotate in the second direction. The second shaft drive voltage fluctuates according to a second shaft drive period. There is a working interval and a flyback interval in each second shaft drive period. The foregoing working interval may be a forward working interval, a reverse working interval, or the like, which is not specifically limited in this application. In the following embodiments, the forward working interval is used as an example.

Exemplarily, when the second shaft of the MEMS galvanometer is placed along the horizontal direction, the second direction is the pitch direction, and if the second shaft drive voltage is in the forward working interval, in this case, the MEMS galvanometer scans in the forward direction, that is, the second direction. This indicates that a pitch angle at the front of the mirror 230 changes from a maximum pitch angle to a minimum pitch angle through rotation from an uppermost side to a lowermost side. That is, a corresponding scanning track is from an uppermost end of the entire frame to a lowermost end of the entire frame. When the second shaft drive voltage is in the flyback interval, the MEMS galvanometer flies back in the pitch direction, that is, the pitch angle at the front of the mirror 230 is controlled to change from the minimum pitch angle back to the maximum pitch angle. The maximum pitch angle indicates a position with the maximum pitch angle of the mirror 230 in the forward working interval at the start moment. When the second shaft drive voltage is in duration of the flyback interval, the laser emitter 110 does not emit the laser beam S. That is, in the flyback interval, the MEMS galvanometer does not leave a scanning track.

Figure 4:
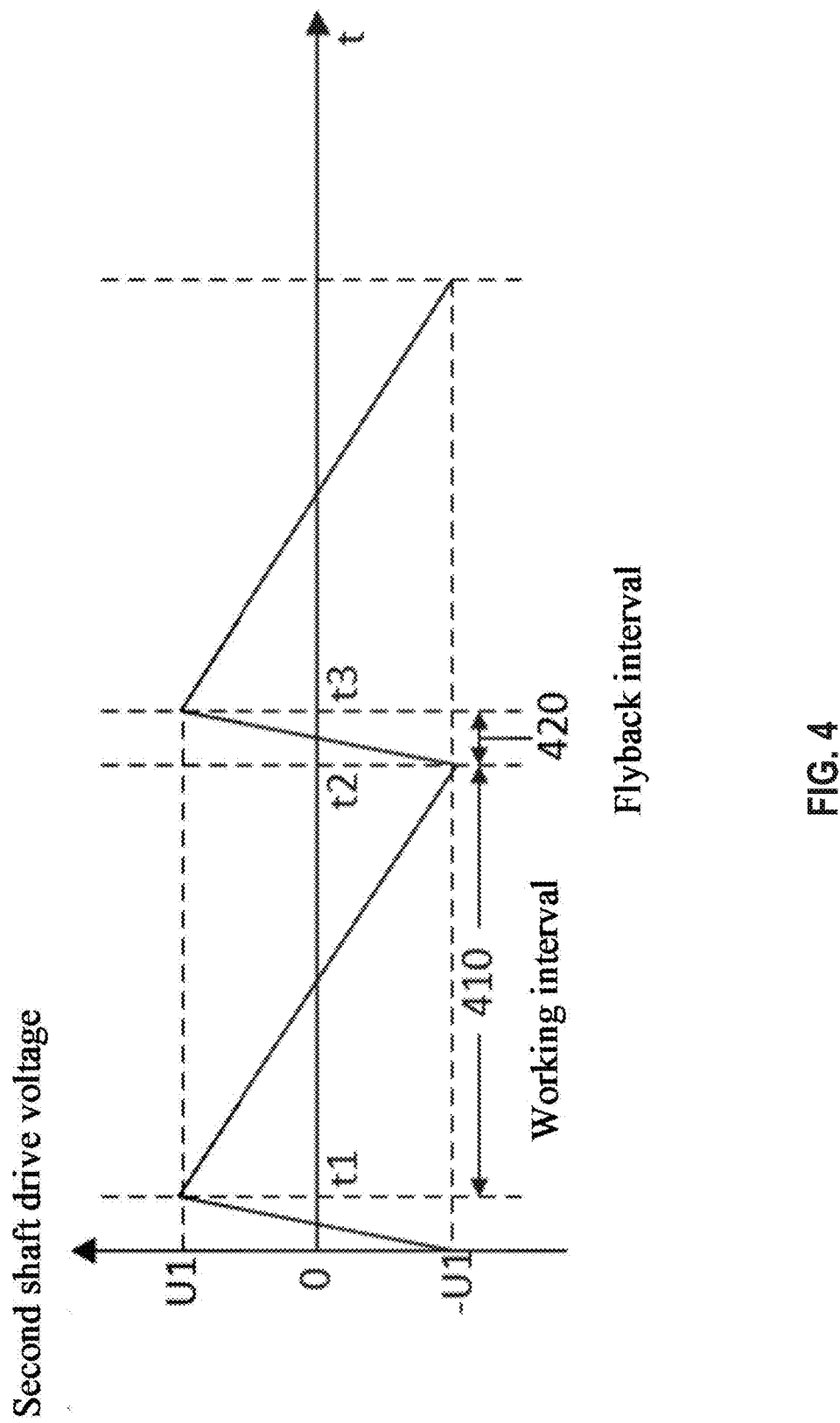
FIG. 4 is a schematic diagram of a second shaft drive voltage according to an exemplary embodiment of this application.

Exemplarily, FIG. 4 is a schematic diagram of a second shaft drive voltage according to an exemplary embodiment of this application. It can be seen from FIG. 4 that the second shaft drive period may include a working interval 410 and a flyback interval 420. The working interval 410 has a start moment t1 and an end moment t2.

When the second shaft drive voltage is at moment t1 corresponding to U1, that is, the maximum value, the second shaft 250 drives the coil frame 220 to rotate in the second direction to an angle 3, that is, a maximum angle in a forward direction, for example, 8°. In this case, the MEMS galvanometer can scan the farthest forward position in the scanning track in the second direction, for example, the uppermost position.

When the second shaft drive voltage is at moment t2 corresponding to −U1, that is, the minimum value, the second shaft 250 drives the coil frame 220 to rotate in the second direction to an angle 4, that is, a maximum angle in a reverse direction, for example, −8°. In this case, the MEMS galvanometer can scan the farthest reverse position in the scanning track in the second direction, for example, the lowermost position. The flyback interval 420 has a start moment t2 and an end moment t3. That is, at moment t2, the second shaft drive voltage starts to be used to control the coil frame 220 to rotate to an initial position in the second direction, so that the coil frame 220 returns to the initial position in the second direction at moment t3. The initial position in the second direction is the position of angle 3 corresponding to coil frame 220 at moment t1.

Because the rotation of the coil frame 220 in the second direction can drive the mirror 230 to rotate in the second direction, when the second shaft drive voltage changes at a constant speed from U1 to −U1 based on a corresponding drive voltage in the working interval 410, the coil frame 220 drives the mirror 230 to rotate in the second direction, so that the galvanometer scans from the uppermost end to the lowermost end of the frame to complete scanning in one frame.

When the MEMS galvanometer is driven at a first shaft drive voltage, under the action of the electromagnetic force, the mirror 230 is inclined to some extent. The greater the drive voltage, the larger the rotation angle. The first shaft drive voltage is used to control the mirror 230 to rotate in the first direction. The first shaft drive voltage may periodically fluctuate based on a preset waveform. The preset waveform may be a sine wave, a cosine wave, or the like, which is not specifically limited in this application. In the following embodiment, the sine waveform is used as an example.

Figure 3:
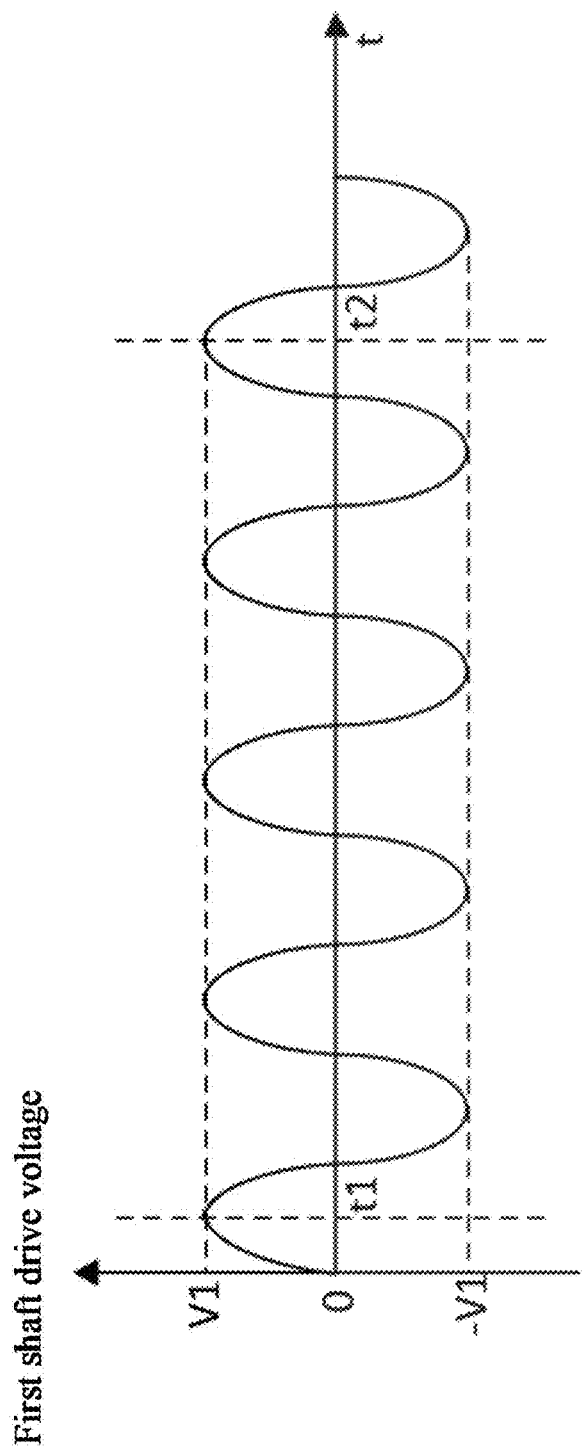
FIG. 3 is a schematic diagram of a first shaft drive voltage according to an exemplary embodiment of this application.

Exemplarily, as shown in FIG. 3, which is a schematic diagram of a first shaft drive voltage according to an exemplary embodiment of this application. It can be seen from FIG. 3 that the first shaft drive voltage changes from V1 to −V1 based on a sine curve, to control the mirror 230 to rotate in the first direction. Exemplarily, when the second shaft of the MEMS galvanometer is placed in the horizontal direction, the front of the mirror 230 rotates from the leftmost side to the rightmost side. That is, the scanning track of the galvanometer is from the leftmost end to the rightmost end of the frame. Certainly, when the first shaft drive voltage changes from V1 to −V1, the front of the mirror 230 may also rotate from the rightmost side to the leftmost side. This may be set as required and is not limited herein.

When the first shaft drive voltage is V1, that is, the maximum value, the first shaft 240 drives the mirror 230 to rotate in the first direction to an angle 1, that is, a maximum angle in a forward direction, for example, 10°. In this case, the MEMS galvanometer can scan the farthest forward position in the scanning track in the first direction, for example, the leftmost position.

When the first shaft drive voltage is −V1, that is, the minimum value, the first shaft 240 drives the mirror 230 to rotate in the first direction to an angle 2, that is, a maximum angle in a reverse direction, for example, −10°. In this case, the MEMS galvanometer can scan the farthest reverse position in the scanning track in the first direction, for example, the rightmost position.

Figure 5:
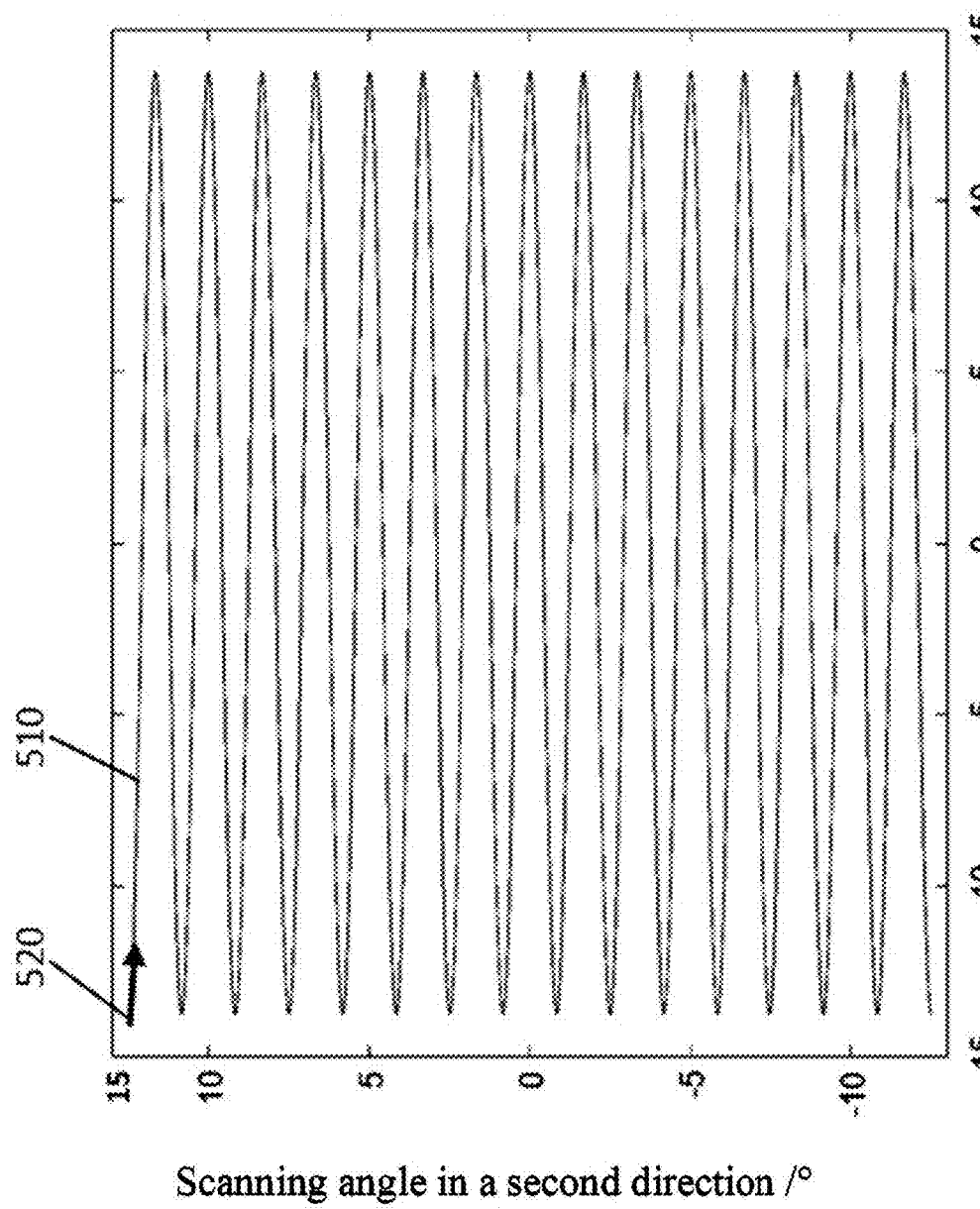
FIG. 5 is a schematic diagram of a scanning track of a galvanometer according to an exemplary embodiment of this application.

The working interval 410 of the second shaft drive voltage is corresponding to M first shaft drive periods, M is a positive integer, and a start moment t1 of the working interval 410 is the same as a start moment of an initial first shaft drive period in the M first shaft drive periods. It can be seen from the foregoing description that in a second shaft drive period, the galvanometer is driven at the second shaft drive voltage to scan in the pitch direction, that is, the scanning track is from the uppermost end to the lowermost end in the frame; or in a first shaft drive period, the galvanometer is driven at the first shaft drive voltage to scan in the horizontal direction, that is, the scanning track is from the leftmost side to the rightmost side in the frame, and then back to the leftmost side. When one second shaft drive period includes M first shaft drive periods, this indicates that during a scanning process from the uppermost end to the lowermost end, the galvanometer also scans M times from the leftmost side to the rightmost side and then back to the leftmost side, to form an approximately S-shaped scanning track shown in FIG. 5. Exemplarily, as shown in FIG. 3 and FIG. 4, first shaft drive voltages corresponding to the start moment t1 and the end moment t2 of the working interval 410 of the second shaft drive voltage are both the maximum values V1. As shown in FIG. 5, when the galvanometer is controlled based on both the second shaft drive voltage and the first shaft drive voltage to deflect the laser beam S for scanning, its scanning track 510 takes the position indicated by arrow 520 as the starting point of scanning and the direction indicated by arrow 520 as the scanning direction, and a complete frame is gradually scanned downward from the position of the upper left corner at the start moment t1 until the position of the lower left corner at the end moment t2.

It can be seen from FIG. 5 that, in the scanning track 510, in the left and right regions of the frame, there is a large gap between adjacent scanning tracks. That is, when the galvanometer scans based on the second shaft drive voltage and the first shaft drive voltage, a scanning blind area is larger and the resolution is lower. In the embodiments of this application, the second shaft drive voltage is adjusted, to solve problems of large scanning blind area and low resolution. The waveform of the first shaft drive voltage can be any waveform that changes periodically. For ease of description, the first shaft drive voltage that changes based on the sine curve is used for description, and the adjusted second shaft drive voltage is superimposed with the first shaft drive voltage to drive the galvanometer to scan, thereby reducing the blind area for scanning and increasing the scanning resolution of the galvanometer.

With reference to FIG. 1 to FIG. 5, a galvanometer provided in an exemplary embodiment of this application is introduced below. The galvanometer 120 includes a first shaft and a second shaft. The first shaft drive voltage is used to control the galvanometer 120 to vibrate around the first shaft, and the second shaft drive voltage is used to control the galvanometer 120 to vibrate around the second shaft; and the first shaft drive voltage and the second shaft drive voltage are superimposed to drive the galvanometer 120. There are N working intervals in a second shaft drive period. In the N working intervals, the second shaft drive voltage and the first shaft drive voltage jointly drive the galvanometer 120 to form N scanning tracks, and the N scanning tracks do not coincide, where N is a positive integer.

When N=2, the second shaft drive period of the galvanometer provided in the exemplary embodiment of this application includes a first working interval and a second working interval.

Exemplarily, a voltage changing rate of the first working interval and a voltage changing rate of the second working interval are opposite numbers, a maximum voltage value of the first working interval is the same as a maximum voltage value of the second working interval, and a minimum voltage value of the first working interval is the same as a minimum voltage value of the second working interval. The first working interval may be a forward working interval, the second working interval may be a reverse working interval, and so on, which is not specifically limited in this application.

Figure 6A:
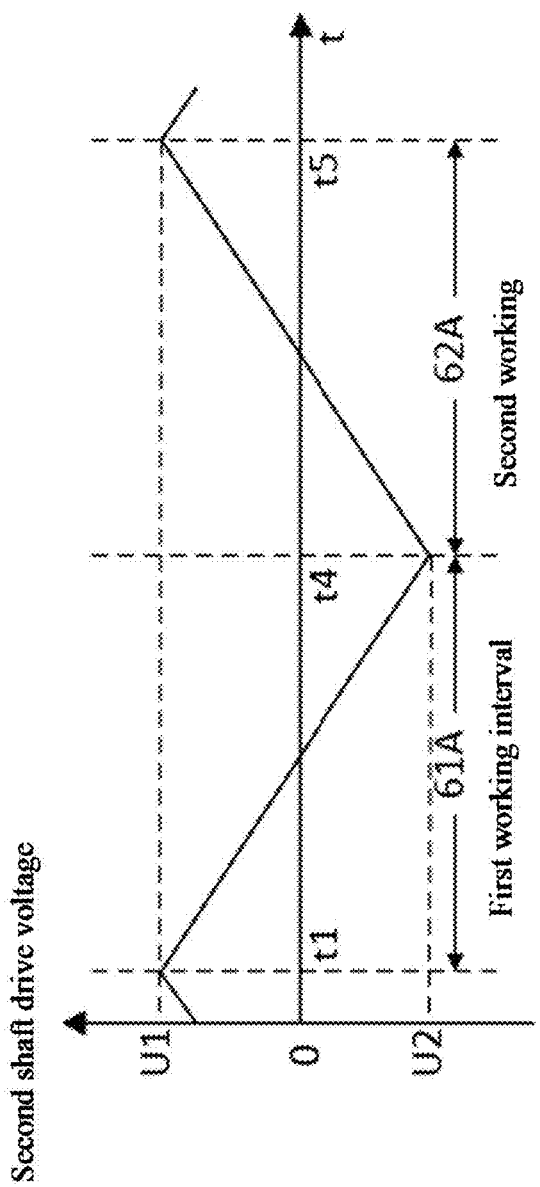
FIG. 6A is a schematic diagram of another second shaft drive voltage according to an exemplary embodiment of this application.

Exemplarily, as shown in FIG. 6A, the second shaft drive period may include a first working interval 61A and a second working interval 62A. The first working interval 61A is a forward working interval, the second working interval 62A is a reverse working interval, and a voltage changing rate of the first working interval 61A and a voltage changing rate of the second working interval 62A are opposite numbers. The first working interval 61A has a start moment t1 and an end moment t4, that is, the galvanometer starts scanning in the forward direction at moment t1 and completes scanning in the forward direction at moment t4. The second working interval 62A has a start moment t4 and an end moment t5, that is, the galvanometer starts scanning in the reverse direction at moment t4 and completes scanning in the reverse direction at moment t5. The first working interval 61A and the second working interval 62A have equal duration, a maximum voltage value of the first working interval 61A is the same as a maximum voltage value of the second working interval 62A, and a minimum voltage value of the first working interval 61A is the same as a minimum voltage value of the second working interval 62A. That is, the maximum voltage value corresponding to the first working interval at moment t1 is U1, the maximum voltage value corresponding to the second working interval at moment t5 is U1, and the minimum voltage value corresponding to the first working interval and the second working interval at moment t4 is U2.

Exemplarily, the second shaft drive period is corresponding to (M+½) first shaft drive periods, M is a positive integer, and a start moment of the first working interval is the same as a start moment of an initial first shaft drive period. It can be seen from the foregoing description that when the second shaft drive period is corresponding to M first shaft drive periods, during a scanning process from the uppermost end to the lowermost end, the galvanometer also scans M times from the leftmost side to the rightmost side and then back to the leftmost side, to form an approximately S-shaped scanning track. The scanning track starts from the upper left corner and ends at the lower left corner. When the second shaft drive period is corresponding to (M+½) first shaft drive periods, after the galvanometer performs reciprocating scanning in the horizontal direction M times, in the last half period, the galvanometer scans from the leftmost side to the rightmost side. In addition, the second shaft drive period corresponding to (M+½) first shaft drive periods includes a first working interval and a second working interval whose voltage changing rates are opposite numbers. Taking the foregoing example as an example, in the first working interval, the galvanometer scans from the uppermost end to the lowermost end, and in the second working interval, the galvanometer scans from the lowermost end to the uppermost end. Rotation manners of the first shaft and the second shaft are combined, and the scanning track of the galvanometer starts from the upper left corner downward to the lowermost end, and then extends upward and ends at the upper right corner.

Figure 6B:
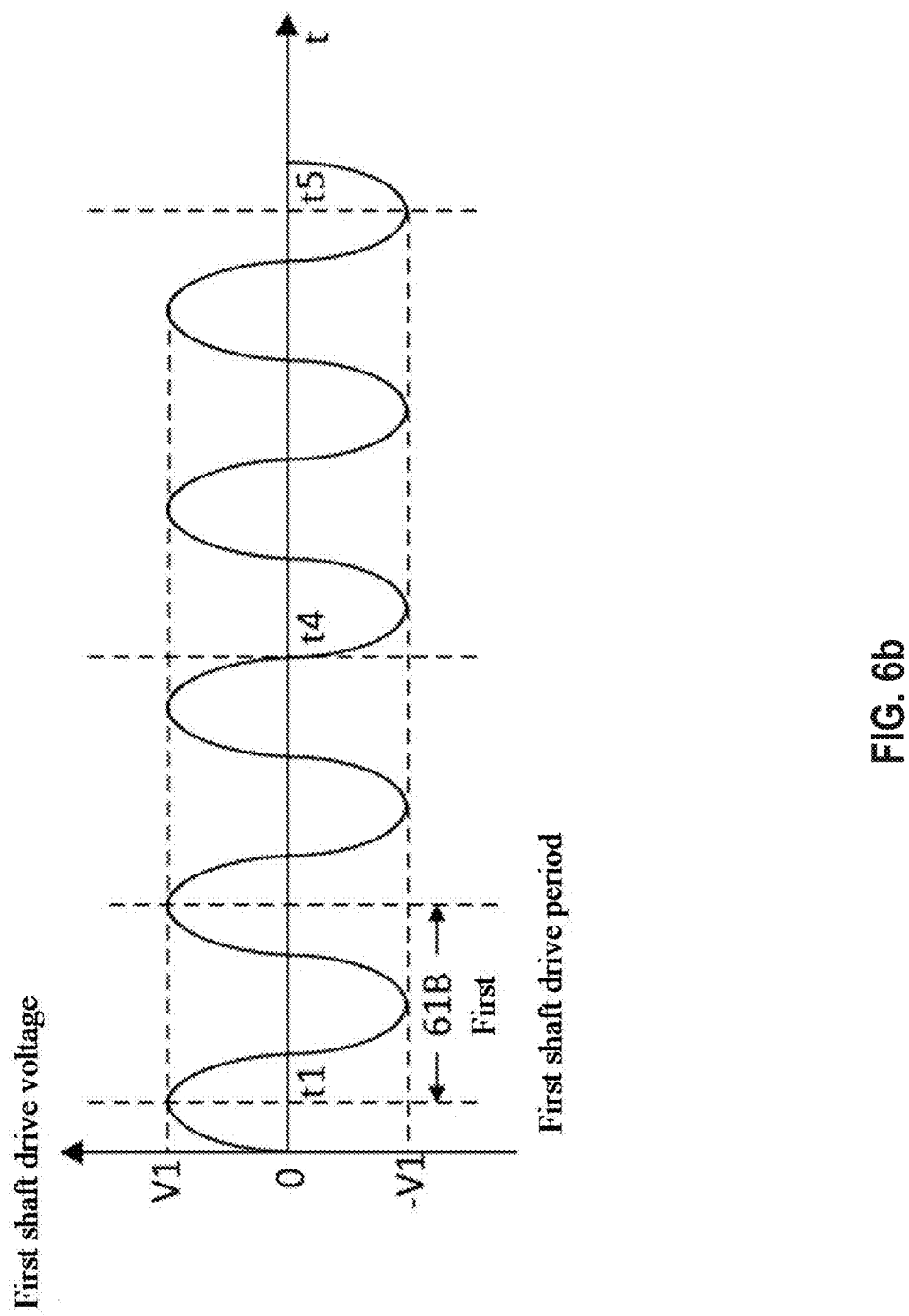
FIG. 6B is a schematic diagram of another first shaft drive voltage according to an exemplary embodiment of this application.

Exemplarily, when M is 4, as shown in FIG. 6B, the second shaft drive period in FIG. 6A is corresponding to (4+½) first shaft drive periods. The start moment of the first working interval 61A of the second shaft drive period and the start moment of the initial first shaft drive period 61B are the same and both are the moment t1.

Exemplarily, when M is an odd number, an end moment of the first working interval is the same as a moment corresponding to a $([M/2]+\frac{3}{4})^{th}$ first shaft drive period, and a start moment of the second working interval is the same as the end moment of the first working interval; or when M is an even number, the end moment of the first working interval is the same as a moment corresponding to a $([M/2]+\frac{1}{4})^{th}$ second shaft drive period, and the start moment of the second working interval is the same as the end moment of the first working interval. It can be learned that [ ] represents an operation for extracting integers.

Figure 6C:
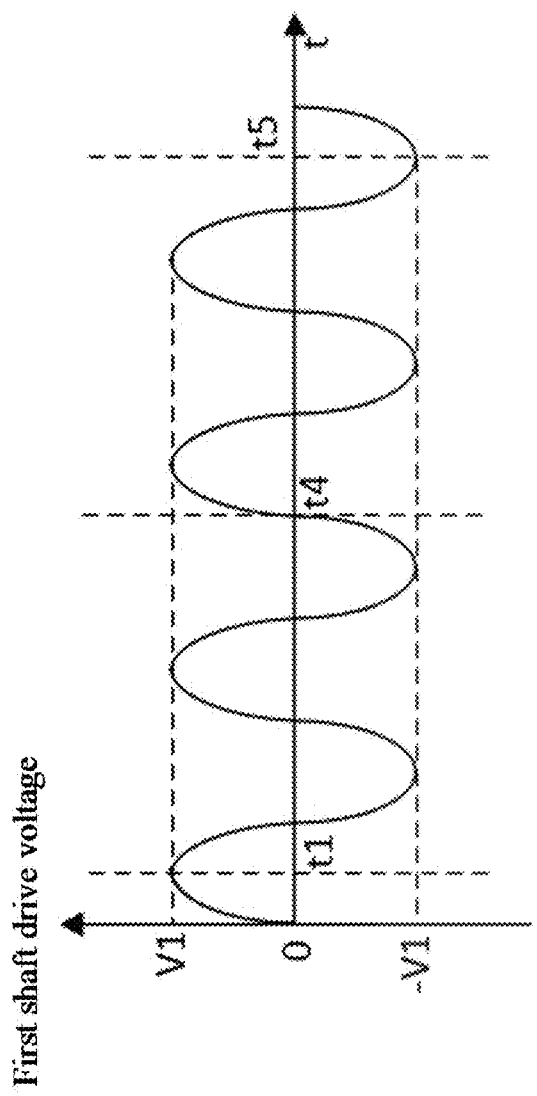
FIG. 6C is a schematic diagram of another first shaft drive voltage according to an exemplary embodiment of this application.

Exemplarily, when M=3, which is an odd number, the second shaft drive period includes (3+½) first shaft drive periods. As shown in FIG. 6C, the end moment t4 of the first working interval 61A in FIG. 6A is the same as a moment corresponding to a $([3/2]+\frac{3}{4})^{th}$ first shaft drive period, that is, a $(7/4)^{th}$ first shaft drive period. That is, when the galvanometer 120 scans, the last row of the scanning track starts from the upper right end to the lower left end, and at the middle position of the last row, the voltage changing rate of the second shaft drive period becomes an opposite number, and in this case, the galvanometer 120 starts reverse scanning in the second direction. That is, the galvanometer 120 starts scanning from the middle position of the last row to the upper left end, and completes scanning at the upper right end. When M=4, which is an even number, the second shaft drive period includes (4+½) first shaft drive periods. As shown in FIG. 6B, the end moment t4 of the first working interval 61A in FIG. 6A is the same as a moment corresponding to a $([4/2]+\frac{1}{4})^{th}$ first shaft drive period, that is, a $(9/4)^{th}$ first shaft drive period. That is, when the galvanometer 120 scans, the last row of the scanning track starts from the upper left end to the lower right end, and at a middle position of the last row, the voltage changing rate of the second shaft drive period becomes an opposite number, and in this case, the galvanometer 120 starts reverse scanning in the second direction. That is, the galvanometer 120 starts scanning from the middle position of the last row to the upper right end, and completes scanning at the upper right end.

Figure 7:
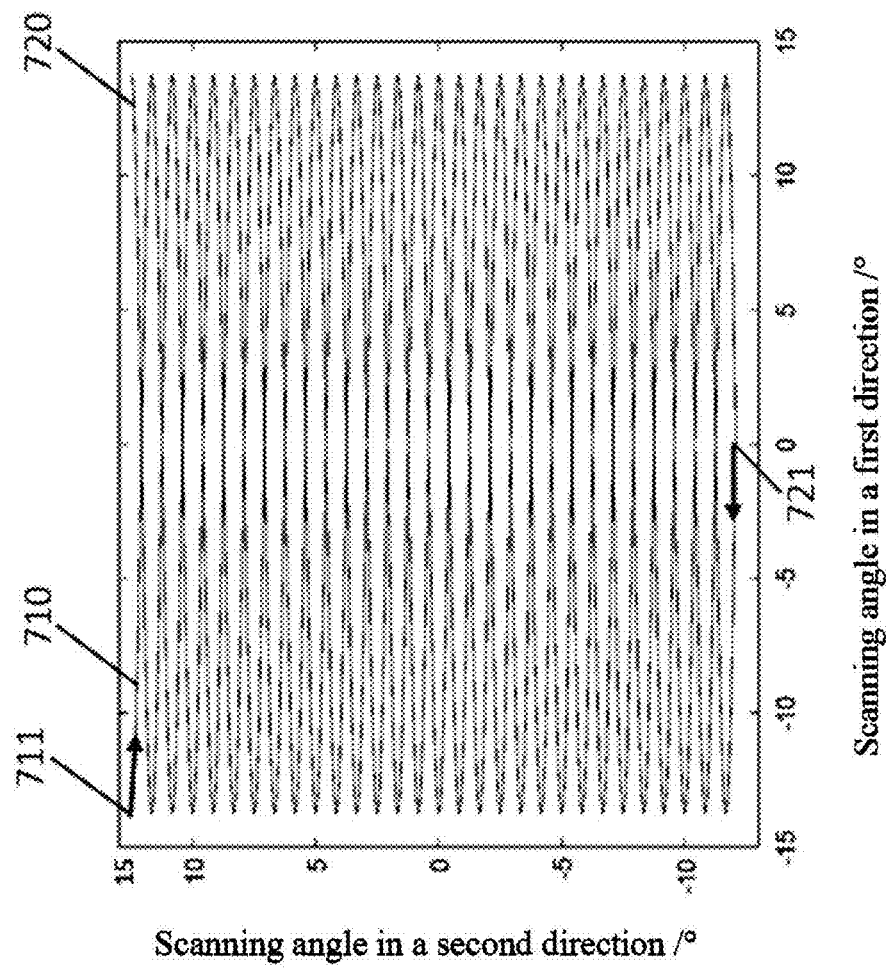
FIG. 7 is a schematic diagram of another scanning track of a galvanometer according to an exemplary embodiment of this application.

The second shaft drive voltage and the first shaft drive voltage may be superimposed to jointly drive the galvanometer 120 to scan, that is, to control the scanning track of the galvanometer 120 in the entire image. Taking the foregoing as an example, the second shaft drive voltage of the galvanometer 120 is shown in FIG. 6A, and the corresponding drive voltage in the first working interval 61A can change from U1 to U2 at a constant speed, to control the mirror to rotate in the second direction, such as the pitch direction, which is equivalent to scanning of the galvanometer 120 from the uppermost end to the lowermost end of the frame. For the second shaft drive voltage, the corresponding drive voltage in the second working interval 62A can also change from U2 to U1 at a constant speed, to control the mirror 120 to rotate in the second direction, such as the pitching direction, which is equivalent to scanning of the galvanometer 120 from the lowermost end to the uppermost end of the frame. When the galvanometer 120 is jointly driven at the second shaft drive voltage and the first shaft drive voltage with the sine waveform, as shown in FIG. 7, a position in the scanning track 710 as indicated by arrow 711 is the starting point of scanning, a direction indicated by arrow 711 is the scanning direction, and the scanning starts from the upper left corner down to the middle position of the lowermost end. The scanning track 710 is obtained during galvanometer scanning based on the first working interval 61A of the second shaft drive voltage and the first shaft drive voltage. In some embodiments, a position in the scanning track 720 as indicated by arrow 721 is the starting point of scanning, a direction indicated by arrow 721 is the scanning direction, and the scanning starts from the middle position at the lowermost end to the upper right corner. The scanning track 720 is obtained during galvanometer scanning based on the second working interval 61A of the second shaft drive voltage and the first shaft drive voltage. The more the first shaft drive periods corresponding to the second shaft drive period, that is, the larger M, the denser the scanning tracks.

In this embodiment of this application, scanning is performed again in the reverse direction when the first working interval ends, that is, at the middle position at the lowermost end in the scanning track, interpolation and regression are performed in the reverse direction based on the preset track, and two frames of scanning tracks are superimposed to obtain one detection data frame, so that the scanning track is denser, which can supplement a blank region of single-frame scanning, reduce blind area, and improve scanning resolution in the vertical direction.

Exemplarily, when N is greater than or equal to 2, there are N working intervals in a second shaft drive period of the galvanometer 120 provided in the exemplary embodiment of this application, and voltage changing rates respectively corresponding to N working intervals are the same, maximum voltage values respectively corresponding to the N working intervals are the same, and minimum voltage values respectively corresponding to the N working intervals are the same. N is a positive integer.

Exemplarily, each working interval is corresponding to X consecutive first shaft drive periods; X is a positive integer; and a difference between an initial phase of an initial first shaft drive period corresponding to an $i^{th}$ working interval and an initial phase of an initial first shaft drive period corresponding to the first working interval is $$\frac{i-1}{N} \times 360°,$$

where i is a positive integer less than or equal to N.

Exemplarily, there are further a flyback interval and a delay interval between two adjacent working intervals, a start moment of the flyback interval is the same as an end moment of a previous working interval, an end moment of the flyback interval is the same as a start moment of the delay interval, an end moment of the delay interval is the same as a start moment of a next working interval, a maximum voltage value of the flyback interval is the same as a maximum voltage value of any working interval, and a minimum voltage value of the flyback interval is the same as a minimum voltage value of any working interval.

Exemplarily, flyback intervals have equal duration and delay intervals have equal duration.

Exemplarily, a sum of the duration of the flyback interval and the delay interval is the same as duration corresponding to $$\frac{1}{N}$$

first shaft drive periods.

Figure 8A:
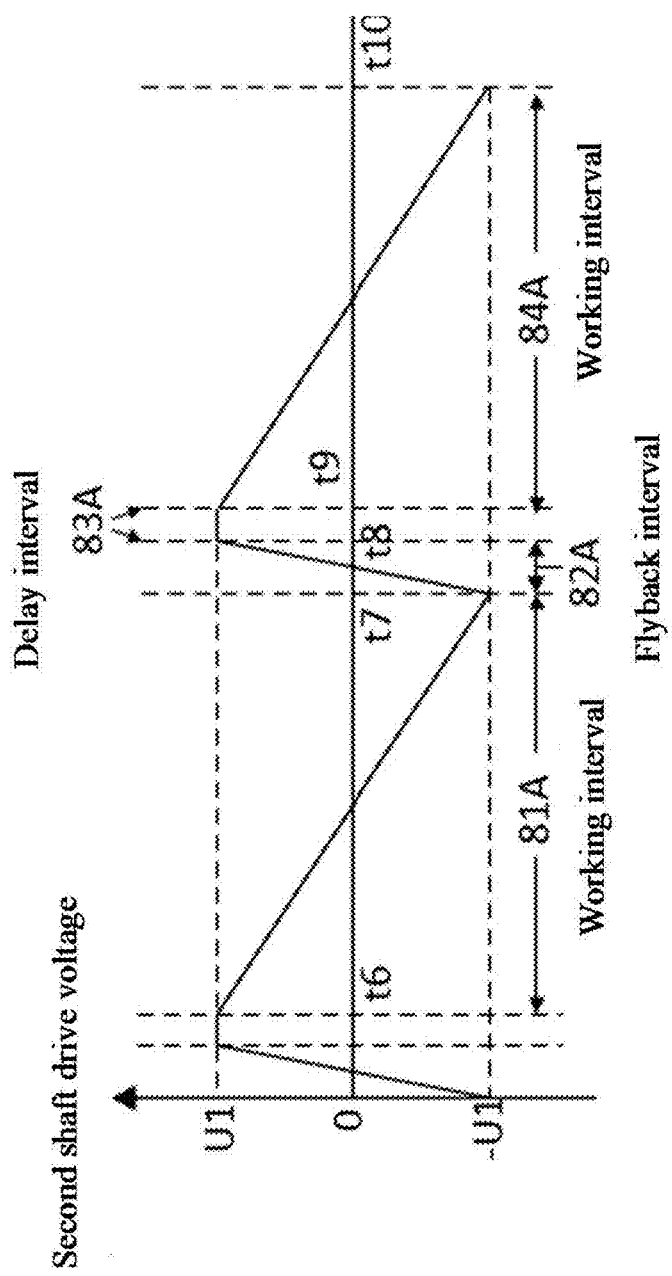
FIG. 8A is a schematic diagram of still another second shaft drive voltage according to an exemplary embodiment of this application.

For simplicity, N=2 is used as an example for description. As shown in FIG. 8A, the second shaft drive period includes a first working interval 81A and a second working interval 84A. The first working interval 81A and the second working interval 84A are corresponding to the same voltage changing rate, and are both corresponding to the maximum voltage value U1 and the minimum voltage value −U1. In duration of the first working interval 81A and the second working interval 84A of the second shaft drive voltage, rotation angle ranges of the galvanometer in the second direction are the same, for example, −8° to 8°. There are further a flyback interval 82A and a delay interval 83A between two working intervals. A start moment of the flyback interval 82A is the same as an end moment t7 of the first working interval 81A, and an end moment of the flyback interval 82A is the same as a start moment t8 of the delay interval 83A. The end moment of the delay interval 83A is the same as the start moment t9 of the second working interval 84A. The maximum voltage value of the flyback interval 82A and the maximum voltage value of any working interval are the same, that is, both are U1. The minimum voltage value of the flyback interval 82A and the minimum voltage value of any working interval are the same, that is, both are −U1. The drive voltage in the delay interval 83A remains unchanged, and in the flyback interval 82A and the delay interval 83A, the laser emitter 110 does not emit the laser beam S, that is, in the flyback interval 82A and the delay interval 83A, the galvanometer 120 does not leave a scanning track.

Figure 8B:
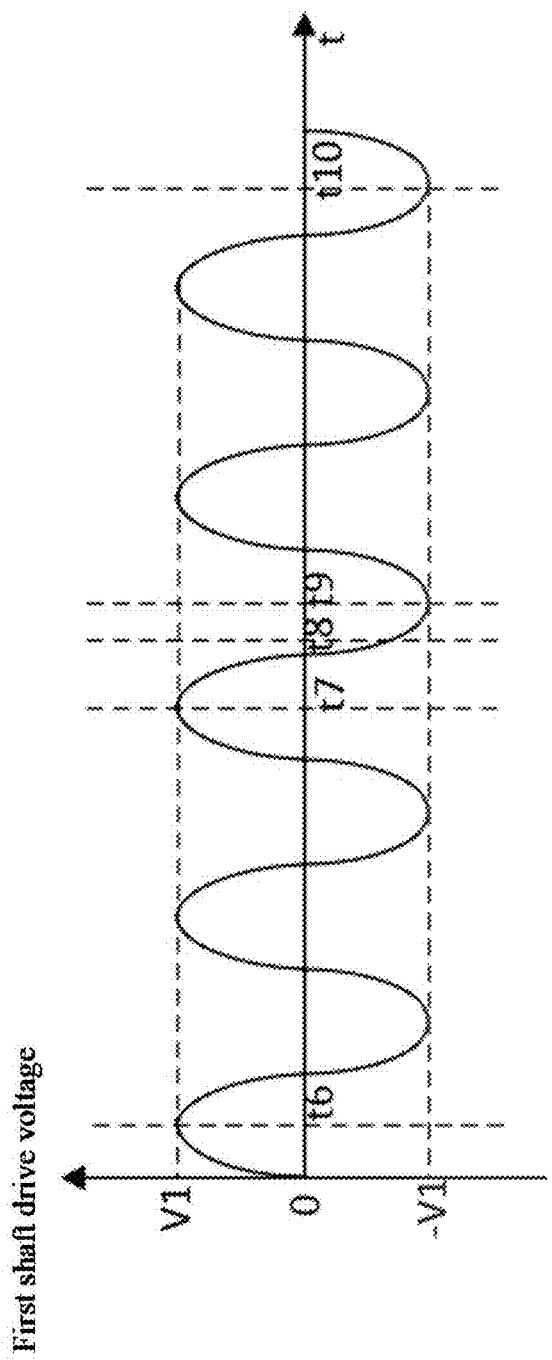
FIG. 8B is a schematic diagram of still another first shaft drive voltage according to an exemplary embodiment of this application.

Exemplarily, as shown in FIG. 8B, when X=2, each working interval is corresponding to 2 consecutive first shaft drive periods. A difference between an initial phase of an initial first shaft drive period corresponding to the second working interval 84A and an initial phase of an initial first shaft drive period corresponding to the first working interval 81A is 180°. As shown in FIG. 8A and FIG. 8B, a sum of the duration of the flyback interval 82A and the delay interval 83A is the same as duration corresponding to ½ of first shaft drive periods, that is, corresponding delay time of the initial first shaft drive period of the second working interval 84A relative to the phase delay of the initial first shaft drive period of the first working interval 81A. The initial phase of the first shaft drive voltage may be 90°, 180°, or the like, which is not specifically limited in this application.

Figure 8C:
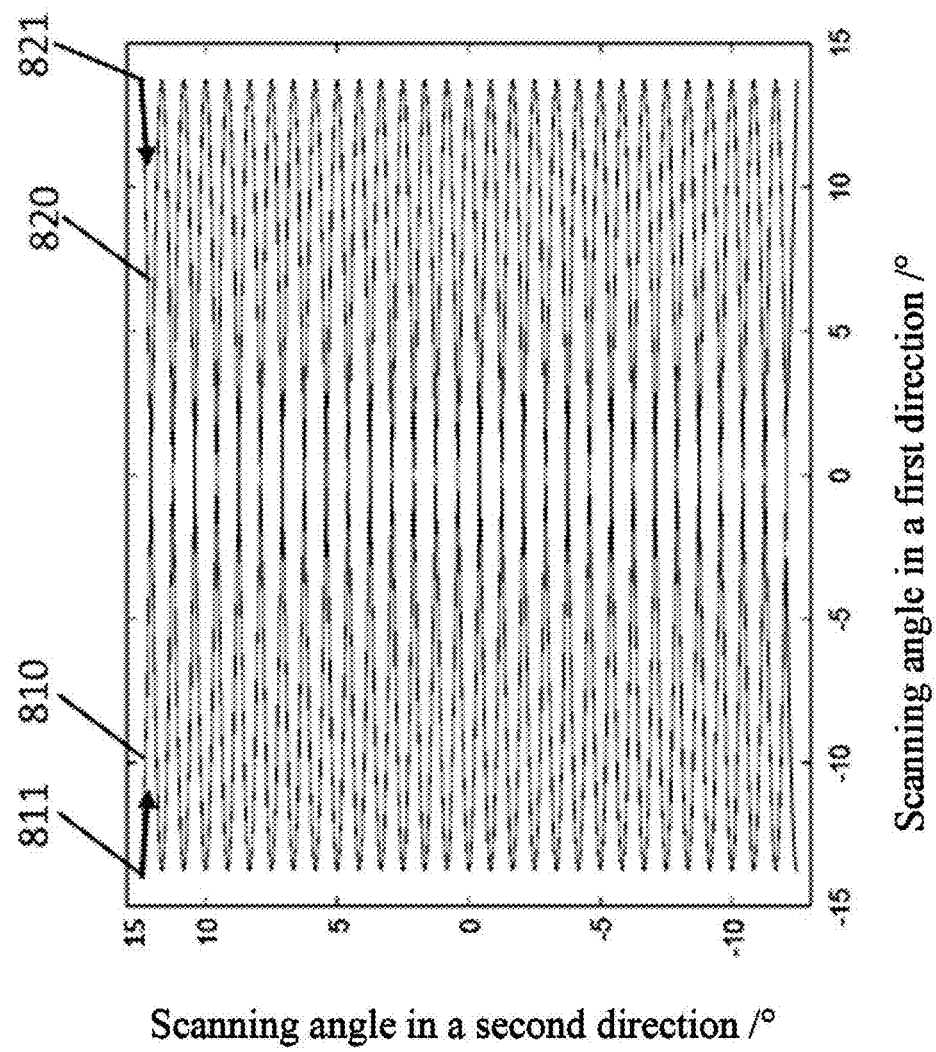
FIG. 8C is a schematic diagram of still another scanning track of a galvanometer according to an exemplary embodiment of this application.

Exemplarily, the first shaft drive voltage and the second shaft drive voltage, including the two working intervals, the flyback interval, and the delay interval, may be superimposed to jointly drive the galvanometer 120 to scan, that is, to control the scanning track of the galvanometer 120 in the entire frame. Taking the foregoing as an example, when N=2, the galvanometer 120 is driven at both the second shaft drive voltage shown in FIG. 8A and the first shaft drive voltage with the sine waveform, to obtain the scanning track shown in FIG. 8C. A position in the scanning track 810 as indicated by arrow 811 is the starting point of scanning, a direction indicated by arrow 811 is the scanning direction, and the scanning starts from the upper left corner down to lower left corner, completing the scanning of the first working interval. The scanning track 810 is obtained during galvanometer scanning based on the first working interval 81A of the second shaft drive voltage and the plurality of consecutive first shaft drive periods corresponding to the first working interval 81A. After the scanning is completed, based on the flyback interval 82A of the second shaft drive voltage shown in FIG. 8A, the scanning angle of the galvanometer 120 in the second direction, such as the pitch angle for scanning, is adjusted back to an initial scanning angle during scanning at the first frame. That is, the pitch angle of the galvanometer 120 is adjusted from the maximum angle in the negative direction back to the maximum angle in the positive direction. In this process, the laser emitter 110 does not emit the laser beam S, that is, in the flyback interval 82A, the galvanometer 120 does not leave a scanning track during rotation. Then, after a delay interval 83A, the galvanometer 120 only starts scanning of the second working interval while a voltage at an end moment t9 in the delay interval 83A is −V1, and a difference between a phase of the first shaft drive voltage corresponding to the end moment t9 in the delay interval 83A and the initial phase of the first shaft drive voltage is 180°, that is, a difference between an initial phase of an initial first shaft drive period corresponding to the second working interval 84A and an initial phase of an initial first shaft drive period corresponding to the first working interval 81A is 180°. In duration of the delay interval 83A, the laser emitter 110 does not emit the laser beam S. That is, in the delay interval 83A, the galvanometer 120 does not leave a scanning track during rotation. In this case, a position in the scanning track 820 as indicated by arrow 821 is the starting point of scanning, a direction indicated by arrow 821 is the scanning direction, and the scanning starts from the upper right corner down to the lower right corner, completing the scanning of the second working interval. The scanning track 820 is obtained during galvanometer scanning based on the second working interval 84A of the second shaft drive voltage and the plurality of consecutive first shaft drive periods corresponding to the second working interval 84A. In this case, a detection data frame is outputted, the scanning track 810 and the scanning track 820 are interpolated into each other to supplement the blank region, and are merged into one frame for outputting, which reduces the blind area and also increases scanning resolution in the vertical direction.

By analogy, when N=3, the second shaft drive period includes 3 working intervals. A difference between an initial phase of an initial first shaft drive period corresponding to the second working interval and an initial phase of an initial first shaft drive period corresponding to the first working interval is $$\frac{2-1}{3} \times 360° = 120°$$

A difference between an initial phase of an initial first shaft drive period corresponding to the third working interval and an initial phase of an initial first shaft drive period corresponding to the first working interval is $$\frac{3-1}{3} \times 360° = 240°.$$

Figure 9:
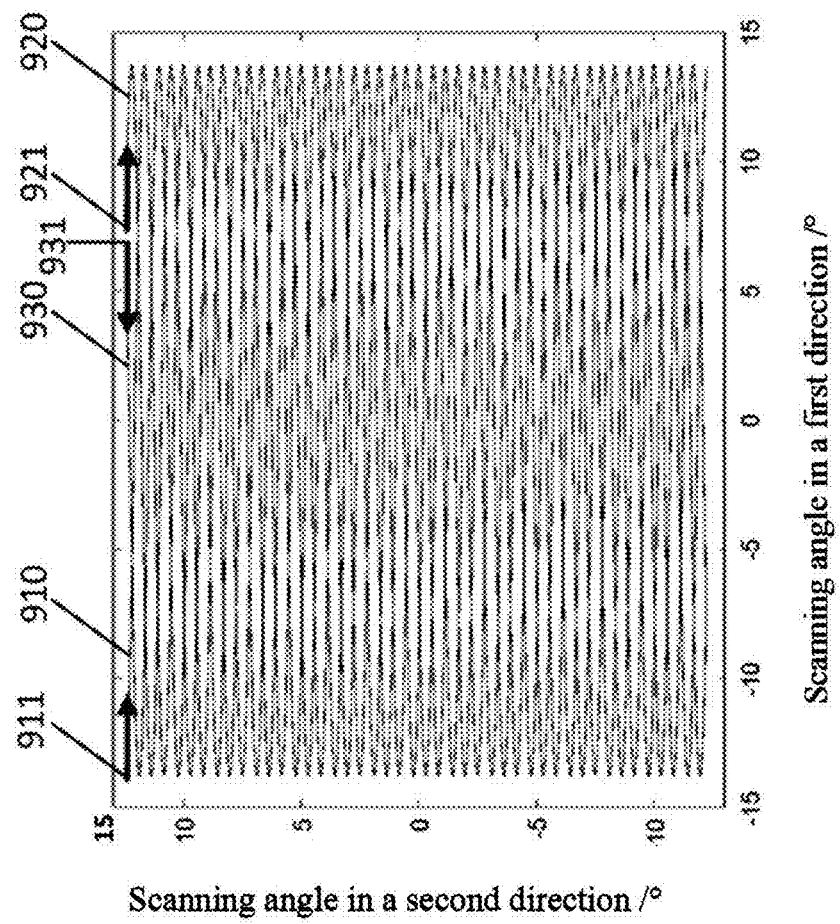
FIG. 9 is a schematic diagram of yet another scanning track of a galvanometer according to an exemplary embodiment of this application.

The foregoing three working intervals are all corresponding to equal maximum voltage values and equal minimum voltage values. There are further a flyback interval and a delay interval between each two adjacent working intervals, the start moment of the flyback interval is the same as the end moment of a previous working interval, the end moment of the flyback interval is the same as the start moment of the delay interval, the end moment of the delay interval is the same as a start moment of a next working interval, a maximum voltage value of the flyback interval is the same as a maximum voltage value of any working interval, and a minimum voltage value of the flyback interval is the same as a minimum voltage value of any working interval. Flyback intervals have equal duration and delay intervals have equal duration. A sum of duration of one fly back interval and one delay interval is the same as duration corresponding to ⅓ of the first shaft drive period. The galvanometer 120 is driven at both the second shaft drive voltage and the first shaft drive voltage with the sine waveform, and scanning may be performed three times non-repetitively. A scanning track is shown in FIG. 9. A position in the scanning track 910 as indicated by arrow 911 is the starting point of scanning, a direction indicated by arrow 911 is the scanning direction, and the scanning starts from the upper left corner down to the lower left corner, obtaining the first scanning track. The scanning track 910 is obtained during galvanometer scanning based on the first working interval of the second shaft drive voltage and the X consecutive first shaft drive periods corresponding to the first working interval. In some embodiments, a position in the scanning track 920 as indicated by arrow 921 is the starting point of scanning (a position at ⅔ of the first row from left to right), a direction indicated by arrow 921 is the scanning direction, and the scanning starts from the upper left corner down to the lower left corner, obtaining the second scanning track. The scanning track 920 is obtained during galvanometer scanning based on the second working interval of the second shaft drive voltage and the X consecutive first shaft drive periods corresponding to the second working interval. The difference is 120° between a phase corresponding to the first shaft drive voltage when scanning of the second working interval is started and a phase corresponding to the first shaft drive voltage when scanning of the first working interval is started. A position in the scanning track 930 as indicated by arrow 931 is the starting point of scanning (a position at ⅓ of the first row from right to left), a direction indicated by arrow 931 is the scanning direction, obtaining the third scanning track. The scanning track 930 is obtained during galvanometer scanning based on the third working interval of the second shaft drive voltage and the X consecutive first shaft drive periods corresponding to the third working interval. The difference is 240° between a phase corresponding to the first shaft drive voltage when scanning of the third working interval is started and a phase corresponding to the first shaft drive voltage when scanning of the first working interval is started. The three scanning tracks are superimposed to obtain the scanning track for scanning of the galvanometer, as shown in FIG. 9. The three scanning tracks are merged into one frame for outputting.

In this embodiment of this application, a delay interval is added after each flyback interval of the second shaft drive voltage of the galvanometer, and based on the number N of working intervals included in the second shaft drive period and duration of each first shaft drive period, the sum of the duration of each flyback interval and delay interval is determined, so that differences between phases corresponding to first shaft drive voltages corresponding to start moments of any two adjacent frames are the same, to ensure that a more uniform track is obtained after scanning of the galvanometer, which can uniformly scan different regions in the field of view, thereby improving detection accuracy. The galvanometer is driven and controlled by using N working intervals of the second shaft drive voltage and the X consecutive first drive voltages corresponding to each working interval, to obtain a plurality of groups of non-repetitive scanning tracks, which can supplement a blank region of single-frame scanning, reduce blind area, and improve scanning resolution. In addition, a greater value of N, that is, the greater number of working intervals included in the second shaft drive period or a greater value of X, that is, the greater number of consecutive first shaft drive periods corresponding to each working interval, indicates higher scanning resolution in the vertical direction and a smaller blind area.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, procedures or the functions according to the embodiments of this application are all or partially generated. The computer may be a general-purpose computer, a special-purpose computer, a computer network, or other programmable apparatuses. The computer instruction may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL) or wireless (for example, infrared, radio, and microwave, or the like) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example. Digital Versatile Disc (DVD), a semiconductor medium (for example, a solid state disk (SSD), or the like.

A person of ordinary skill in the art may understand that all or some of the procedures of the methods in the embodiments may be implemented by a computer program instructing relevant hardware. The program may be stored in a computer-readable storage medium. When the program is executed, the procedures of the methods in the embodiments are performed. In addition, the foregoing storage medium includes various media that can store program code, such as a ROM, a RAM, a magnetic disk, or an optical disc. In absence of conflicts, the embodiments and features in the embodiments may be randomly combined.

The foregoing described embodiments are only exemplary embodiments of this application, and are not intended to limit the scope of this application. Without departing from design spirit of this application, various transformations and improvements made by a person of ordinary skill in the art to the technical solutions of this application shall fall within the protection scope defined in claims of this application.

What is claimed is:

1. A galvanometer, comprising:
a first shaft and a second shaft, wherein
a first shaft drive voltage is used to control the galvanometer to vibrate around the first shaft;
a second shaft drive voltage is used to control the galvanometer to vibrate around the second shaft;
the first shaft drive voltage and the second shaft drive voltage are superimposed to drive the galvanometer; and
there are N working intervals in a second shaft drive period, and in the N working intervals, the second shaft drive voltage and the first shaft drive voltage jointly drive the galvanometer to form N scanning tracks, wherein the N scanning tracks do not coincide and N is a positive integer,
wherein N is greater than or equal to 2; and voltage changing rates respectively corresponding to the N working intervals are the same, maximum voltage values respectively corresponding to the N working intervals are the same, and minimum voltage values respectively corresponding to the N working intervals are the same.

2. The galvanometer according to claim 1, wherein each working interval is corresponding to X consecutive first shaft drive periods, X being a positive integer; and
a difference between an initial phase of an initial first shaft drive period corresponding to an ith working interval and an initial phase of an initial first shaft drive period corresponding to a first working interval is $$\frac{i-1}{N} \times 360°,$$

wherein i is a positive integer less than or equal to N.

3. The galvanometer according to claim 1, wherein there are further a flyback interval and a delay interval between two adjacent working intervals, a start moment of the flyback interval is the same as an end moment of a previous working interval, an end moment of the flyback interval is the same as a start moment of the delay interval, an end moment of the delay interval is the same as a start moment of a next working interval, a maximum voltage value of the flyback interval is the same as a maximum voltage value of any working interval, and a minimum voltage value of the flyback interval is the same as a minimum voltage value of any working interval.

4. The galvanometer according to claim 3, wherein flyback intervals have equal duration and delay intervals have equal duration.

5. The galvanometer according to claim 3, wherein a sum of the duration of the flyback interval and the delay interval is the same as a duration corresponding to $$\frac{1}{N}$$

first shaft drive periods.

6. A LiDAR, comprising: a laser emitter, a controller, and the galvanometer according to claim 1, wherein
the laser emitter is configured to emit a laser beam;
the controller is connected to both the laser emitter and the galvanometer, and is configured to: control the laser emitter to emit a laser beam, and control a first shaft drive voltage and a second shaft drive voltage of the galvanometer; and
the galvanometer is configured to receive and deflect the laser beam emitted by the laser emitter, to change an outgoing angle of the laser beam to implement scanning;
there are N working intervals in a second shaft drive period, and in the N working intervals, the second shaft drive voltage and the first shaft drive voltage jointly drive the galvanometer to form N scanning tracks, wherein the N scanning tracks do not coincide and N is a positive integer, and
wherein N is greater than or equal to 2; and voltage changing rates respectively corresponding to N working intervals are the same, maximum voltage values respectively corresponding to the N working intervals are the same, and minimum voltage values respectively corresponding to the N working intervals are the same.

* * * * *